United States Patent [19]

Matsuura

[11] Patent Number: 5,140,239
[45] Date of Patent: Aug. 18, 1992

[54] NON-CONTACT TRACER CONTROL DEVICE

[75] Inventor: Hitoshi Matsuura, Hachioji, Japan

[73] Assignee: Fanuc Ltd., Yamanashi, Japan

[21] Appl. No.: 668,499

[22] PCT Filed: Jul. 12, 1990

[86] PCT No.: PCT/JP90/00904

§ 371 Date: Mar. 18, 1991

§ 102(e) Date: Mar. 18, 1991

[87] PCT Pub. No.: WO91/01849

PCT Pub. Date: Feb. 21, 1991

[30] Foreign Application Priority Data

Jul. 27, 1989 [JP] Japan .................. 1-194500

[51] Int. Cl.$^5$ .............. G01B 11/00; G01B 19/00
[52] U.S. Cl. .................. 318/577; 318/578; 318/579; 318/571; 364/474.08; 364/474.03
[58] Field of Search .................... 318/560–646; 364/513, 474.03–474.08, 474.28–474.33; 250/202, 222.1, 221

[56] References Cited

U.S. PATENT DOCUMENTS

| | | | |
|---|---|---|---|
| 4,396,832 | 8/1983 | Henderson | 318/577 X |
| 4,625,104 | 11/1986 | Parker et al. | 318/577 X |
| 4,694,153 | 9/1987 | Bejczy et al. | 318/577 X |
| 4,734,572 | 3/1988 | Gorman | 318/577 X |
| 4,933,541 | 6/1990 | Dufour | 318/577 X |
| 4,949,024 | 8/1990 | Matsuura | 318/567 |
| 4,952,772 | 8/1990 | Zana | 318/577 |
| 4,961,155 | 10/1990 | Ozeki et al. | 364/474.37 X |
| 4,999,555 | 3/1991 | Yamazaki et al. | 318/578 |
| 5,067,086 | 11/1991 | Yamazaki et al. | 364/474.08 |

*Primary Examiner*—Paul Ip
*Attorney, Agent, or Firm*—Staas & Halsey

[57] ABSTRACT

A non-contact tracer control device for carrying out a profile machining on a workpiece while tracing the profile of a model in a non-contact fashion. Two non-contact distance detectors (5a, 5b) are slantingly mounted to a tracer head 4) controlled through a rotary axis, and measurement values obtained by the two non-contact distance detectors (5a, 5b) are sampled at predetermined sampling intervals. Based on the measurement values obtained at previous and current sampling times, coordinates of the four vertexes of a very small rectangle on the surface of a model (6) are obtained, and a normal vector is obtained by using the coordinates of three required vertexes out of the four vertexes. The tracer head (4) is rotated in the direction of a projected vector obtained by projecting the normal vector onto an X-Y plane. Accordingly, the measurement axes of the non-contact detectors (5a, 5b) are oriented in a direction as perpendicular as possible to the model surface, thus permitting a high-accuracy distance measurement.

4 Claims, 4 Drawing Sheets

NON-CONTACT TRACER CONTROL DEVICE

TECHNICAL FIELD

This invention relates to a non-contact tracer control device, and more particularly, to a non-contact tracer control device having an improved tracing accuracy.

BACKGROUND ART

Recently, non-contact tracer control devices for tracing a profile of a model by using a non-contact distance detector have been developed, and in this non-contact distance detector, an optical distance detector is used in such a way that it is fixed to the distal end of a tracer head and the distance of the model surface therefrom is detected to thereby provide a tracing. Accordingly, since there is no fear of damage to the model, models made of a soft material can be used, and thus a wider application of the profile machining is expected.

Nevertheless, conventional non-contact tracer control devices have a problem in that the tracing accuracy is lowered at a portion of a model where the angle of inclination is large. Namely, at such a portion, the measurement optical axis of the distance detector becomes almost parallel to the model surface and the spot on the model surface is enlarged and becomes an ellipsoidal shape, thus lowering the resolution of the distance detector and the tracing accuracy. Particularly, in triangulation type distance detectors, a problem sometimes arises in that the measurement optical axis interferes with the model surface, depending on the inclination angle, and thus the measurement becomes impossible.

DISCLOSURE OF THE INVENTION

This invention was created in view of the above circumstances, and an object thereof is to provide a non-contact tracer control device having an improved tracing accuracy.

To solve the above problems, this invention provides a non-contact tracer control device for carrying out a profile machining on a workpiece while tracing a profile of a model in a non-contact fashion, comprising first and second non-contact distance detectors mounted to a tracer head, which is controlled through a predetermined straight axis and a rotary axis rotatable about the straight axis, and inclined at a predetermined angle with respect to the straight axis, each detector individually measuring a distance of a surface of the model therefrom, sampling means for sampling measurement values obtained by the respective first and second non-contact distance detectors at predetermined sampling intervals, storage means for storing a first measurement value obtained by the first non-contact distance detector and a second measurement value obtained by the second non-contact distance detector, both sampled at a previous sampling time, vector calculating means for calculating a vector normal to the surface of the model, based on at least three of four measurement values including the first and second measurement values, a third measurement value obtained by the first non-contact distance detector sampled at a current sampling time, and a fourth measurement value obtained by the second non-contact distance detector sampled at the current sampling time, angle calculating means for calculating an angle of a projected vector obtained by projecting the normal vector onto a plane perpendicular to the straight axis, and rotary axis driving means for rotating the rotary axis in a direction of the angle.

Based on the values measured at the previous and current sampling times by the two non-contact distance detectors mounted to the tracer head, the coordinates of the four vertexes of a very small rectangle on the model surface are obtained, and the normal vector is obtained by using the coordinates of three required vertexes out of the four vertexes. The tracer head is rotated in the direction of a projected vector obtained by projecting the normal vector onto an X-Y plane. Accordingly, the measurement axes of the non-contact distance detectors are oriented in a direction as perpendicular as possible to the model surface, whereby a high-accuracy distance measurement can be carried out.

BEST MODE OF CARRYING OUT THE INVENTION

An embodiment of this invention will be described with reference to the drawings.

Figure 1:
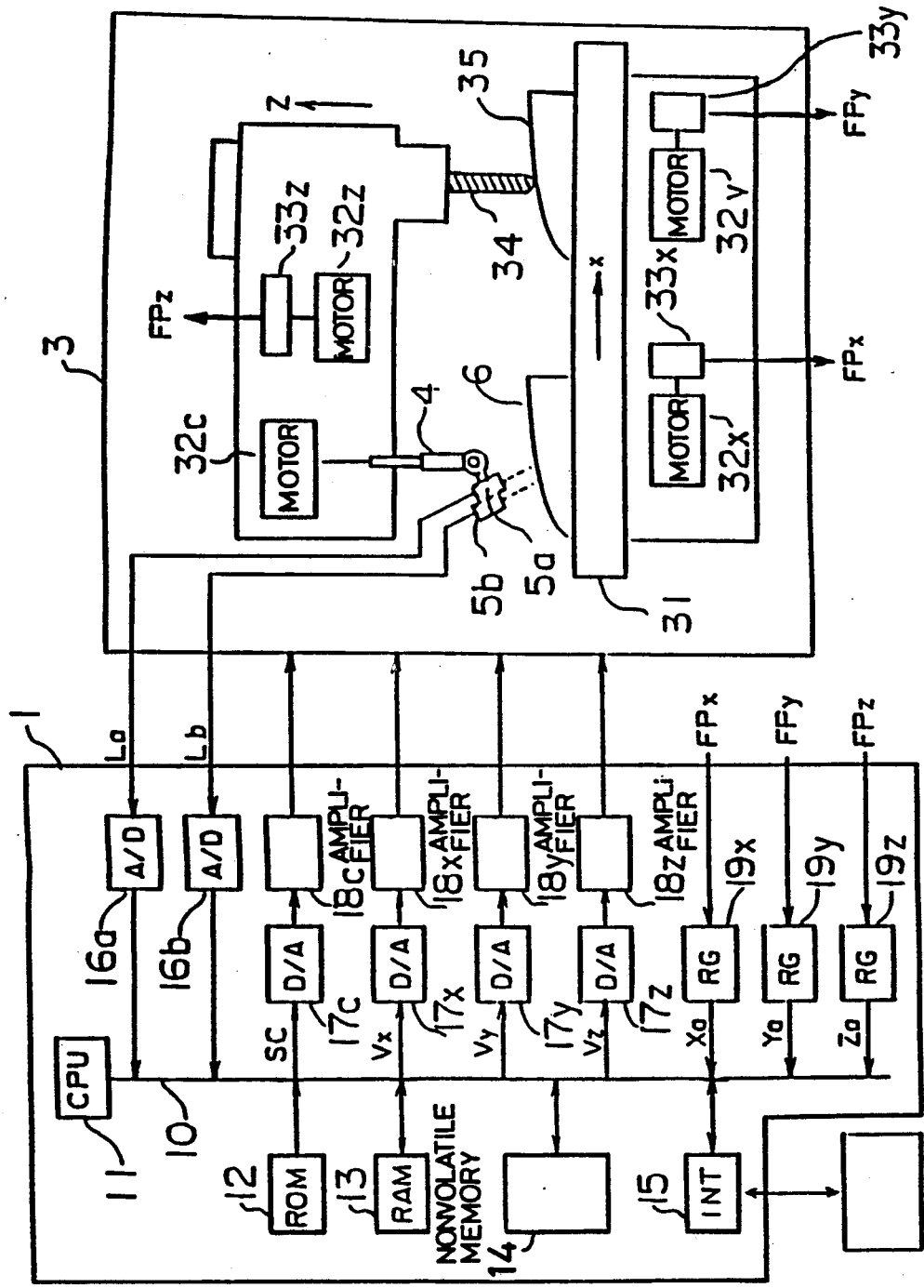
FIG. 1 is a block diagram showing an arrangement of a non-contact tracer control device according to one embodiment of this invention.

FIG. 1 is a block diagram showing an arrangement of a non-contact tracer control device according to this invention, as well as peripheral devices. In the figure, a processor 11 reads out a system program stored in a ROM 12, and controls the whole operation of a tracer control device 1 in accordance with the system program, through a bus 10. A RAM 13, as a temporary memory, stores measurement values supplied from distance detectors, described later, and other temporary data. A nonvolatile memory 14 is backed up by a battery, not shown, and stores various parameters, such as a tracing direction and a tracing speed, etc., input thereto from an operator panel 2 via an interface 15.

Distance detectors 5a and 5b are mounted to a tracer head 4 of a tracing machine tool 3. The distance detectors 5a and 5b each comprise a reflected light quantity type distance detector using a semiconductor laser or a light emitting diode as a light source, and measure the distance of a model 6 therefrom in a non-contact fashion. Measurement values La and Lb obtained from these distance detectors are respectively converted to digital values by A/D converters 16a and 16b in the tracer control device 1, and are successively read by the processor 11.

The processor 11 calculates the amounts of displacement of the individual axes, based on the measurement values La and Lb and signals from current position registers 19x, 19y, and 19z described later, and generates speed commands Vx, Vy and Vz for the individual axes, in accordance with the displacement amounts and the instructed direction and speed for tracing, by using a technique known in the art. These speed commands are converted to analog values by D/A converters 17x, 17y, and 17z and input to servo amplifiers 18x, 18y, and 18z, respectively. Based on the speed commands, the servo amplifiers 18x and 18y drive servomotors 32x and 32y of the tracing machine tool 3, whereby a table 31 is moved in an X-axis direction and in a Y-axis direction perpendicular to the surface of the drawing sheet, and the servo amplifier 18z drives a servomotor 32z, whereby the tracer head 4 and a tool 33 are moved in a Z-axis direction.

The servomotors 32x, 32y, and 32z are respectively provided with pulse coders 33x, 33y, and 33z, which generate detection pulses FPx, FPy, and FPz upon detecting a rotation of the respective servomotors by predetermined amounts. The current position registers 19x, 19y, and 19z in the tracer control device 1 count the detection pulses FPx, FPy, and FPz up or down, respectively, depending on the direction of rotation, to obtain current position data Xa, Ya, and Za of the respective axes, which data is input to the processor 11.

Simultaneously with the above-described control of the individual axes, the processor 11 samples the measurement values La and Lb obtained from the distance detectors 5a and 5b at predetermined sampling intervals, obtains a vector normal to the surface of the model, based on the sampling data and by a method described later, and generates a rotation command SC corresponding to the direction of the normal vector projected onto an X-Y plane. The rotation command SC is converted to an analog value by a D/A converter 17c, and then input to a servo amplifier 18c, whereby a C-axis servomotor 32c is driven in accordance with this command.

Accordingly, the tracer head 4 is rotated to the instructed angle, and the distance of the model 6 therefrom is controlled to a constant value as described later. Simultaneously, the table 31 is moved in the instructed tracing direction at the instructed tracing speed, and a workpiece 35 is machined to a shape similar to that of the model 6 by the tool 34, which is controlled through the Z axis, similar to the tracer head 4.

Figure 2:
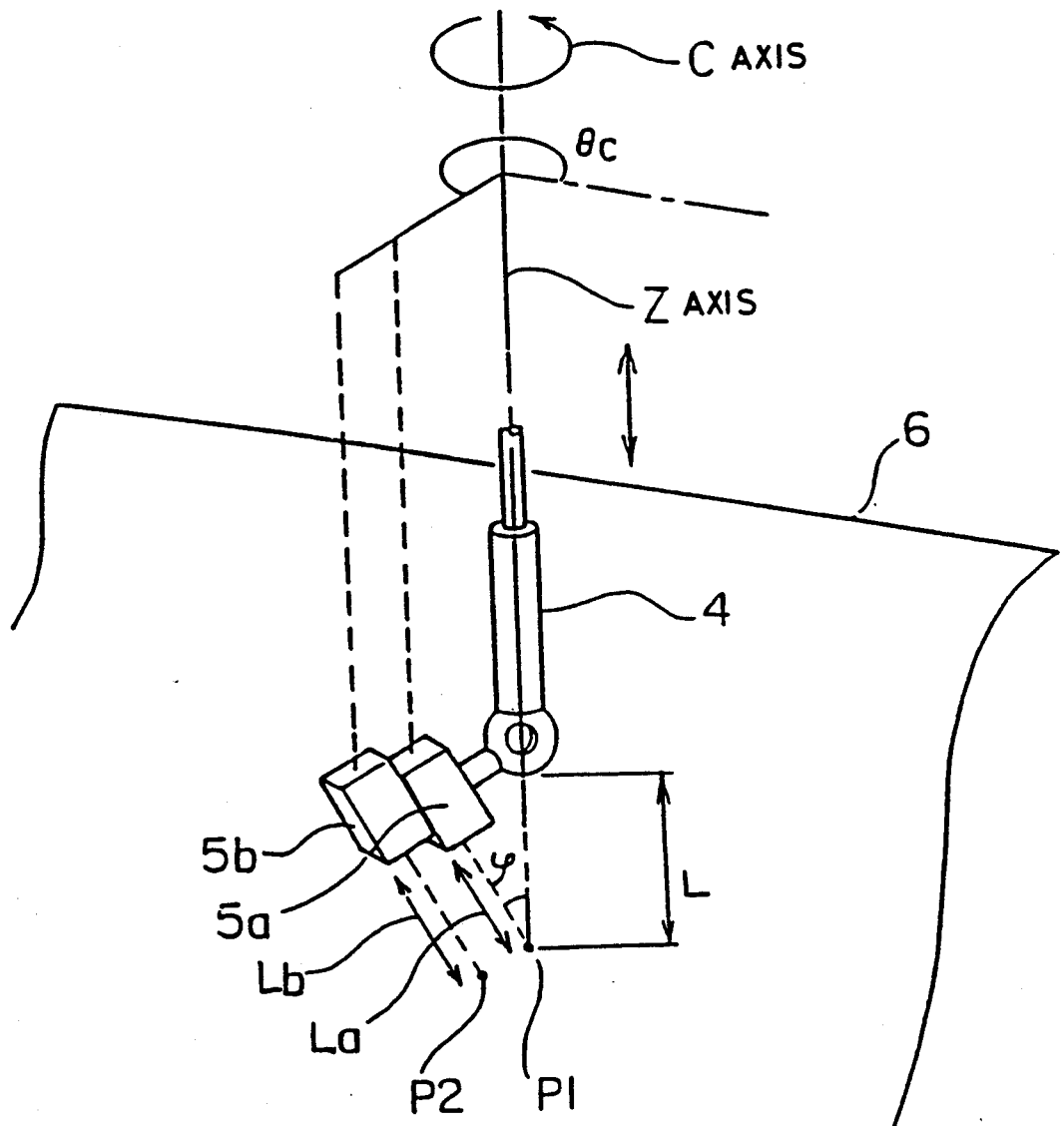
FIG. 2 is a diagram showing in detail a tracer head according to the embodiment of the invention.

FIG. 2 is a diagram illustrating the tracer head 4 in more detail. As shown in the figure, the distance detector 5a is mounted to the tracer head 4 such that it is inclined at an angle $\phi$ with respect to the Z axis, and is rotated along the circumference of a circle having a predetermined radius over the command angle $\Theta c$ of the rotation command SC by the C axis. The distance detector 5b is mounted to the outside of the distance detector 5a, and is similarly rotated over the command angle $\Theta c$.

As mentioned above, the value measured by the distance detector 5a is fed back to the tracer control device, and accordingly, the distance La from the distance detector 5a to a measurement point P1 on the model 6 is maintained at a constant value. This distance La is set to be equal to the distance from the distance detector 5a to a point at which the measurement axis of the detector 5a intersects the Z axis. Accordingly, even when the tracer head 4 is rotated through the C axis, the measurement point P1 remains at the same position, and thus the distance L between the tracer head 4 and the model 6 is maintained at a constant value.

The distance detector 5b measures the distance Lb of a measurement point P2 on the model 6 therefrom, and supplies the measurement result to the tracer control device.

Figure 3:
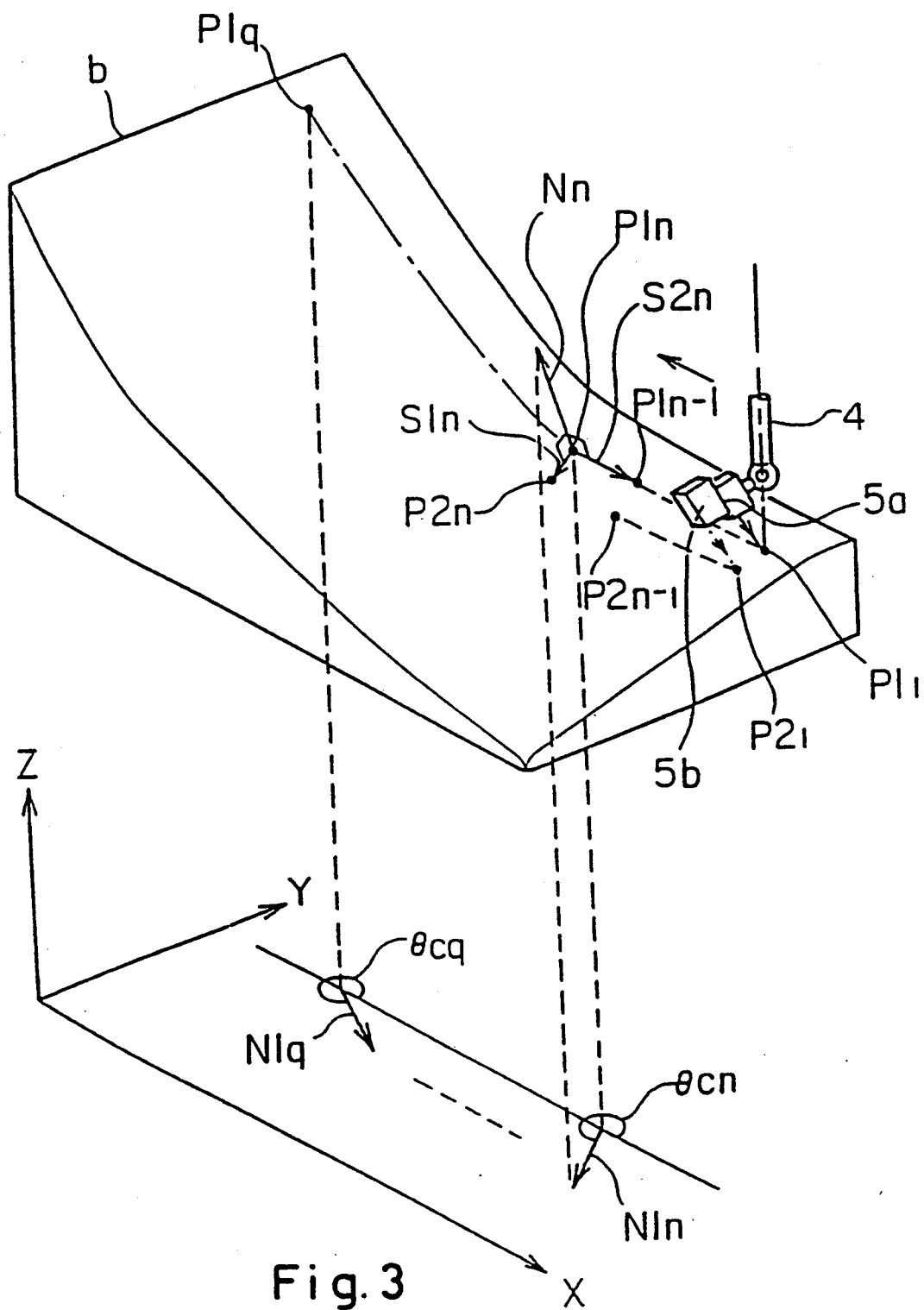
FIG. 3 is a diagram illustrating a method of calculating an angle of rotation of the tracer head according to the embodiment of the invention.

The method of calculating the angle of rotation for the tracer head 4 will be now described with reference to FIG. 3. As shown in the figure, a tracing is carried out while the tracer head 4 is moved in the X-axis direction at a predetermined speed relative to the model 6, and at the same time, the values measured by the distance detectors 5a and 5b are sampled at predetermined intervals. Based on the measurement values and the current position data output from the current position registers, the coordinate values of points $P1_1, \ldots, P1_{n-1}$ and $P1_n$ and points $P2_1, \ldots, P2_{n-1}$ and $P2_n$ on the model 6 are obtained.

Then, a surface vector $S1n[X2_n-X1_n, Y2_n-Y1_n, Z2_n-Z1_n]$ is obtained from, e.g., the coordinates $(X1_n, Y1_n, Z1_n)$ of the point $P1_n$ and the coordinates $(X2_n, Y2_n, Z2_n)$ of the point $P2_n$. Further, a surface vector $S2n[X1_{n-1}-X1_n, Y1_{n-1}-Y1_n, Z1_{n-1}-Z1_n]$ is obtained from the coordinates $(X1_n, Y1_n, Z1_n)$ of the point $P1_n$ and the coordinates $(X1_{n-1}, Y1_{n-1}, Z1_{n-1})$ of the point $P1_{n-1}$.

Subsequently, the outer product of the surface vectors S1n and S2n is calculated, in accordance with the equation given below, to obtain a normal vector Nn at the point Pn.

$$Nn = S1n \times S2n$$

(Nn, S1n and S2n denote the respective vectors.)

Then, an angle $\Theta cn$ between the X axis and a projected vector N1n obtained by projecting the normal vector Nn onto the X-Y plane is obtained by the following equation:

$$\Theta cn = \tan^{-1}(Jn/In)$$

where
In: X-axis component of the vector Nn,
Jn: Y-axis component of the vector Nn, and this angle $\Theta cn$ is output as a command value for the C axis.

This angle varies in accordance with the degree of inclination of the model 6, and is equal, e.g., to $\Theta cq$ at a point P1q.

Accordingly, the tracer head 4 is orientated such that the measurement axes of the distance detectors are always set in a direction as perpendicular as possible to the surface of the model 6, whereby the distance measurement can be carried out with high accuracy.

Figure 4:
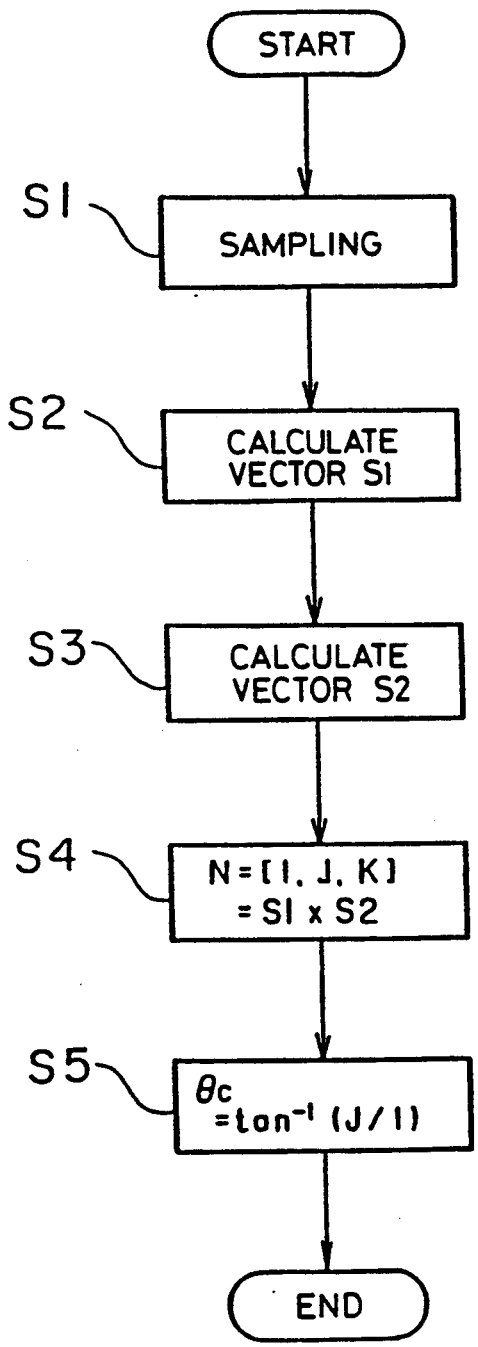
FIG. 4 is a flowchart of a process for calculating the rotation angle according to the embodiment of the invention.

FIG. 4 is a flowchart illustrating the process of calculating the aforesaid angle of rotation. In the figure, the numbers following "S" represent step numbers.

[S1] The measurement values obtained from the distance detectors 5a and 5b are sampled at predetermined intervals.

[S2] The vector S1 is obtained from the current measurement values obtained from the respective distance detectors.

[S3] The vector S2 is obtained from the current measurement value and previous measurement value obtained from the distance detector 5a.

[S4] The surface vector N is obtained by calculating the outer product of the vectors S1 and S2.

[S5] The angle $\Theta c$ between the X axis and the projected vector obtained by projecting the surface vector N onto the X-Y plane is calculated.

In the above embodiment, the normal vector is obtained based on the previous measurement value obtained from one of the distance detectors and the current measurement values obtained from the two distance detectors. Note, this invention is not limited to this process, and the normal vector can be similarly obtained from other combinations of three measurement points out of the four points detected at least at the previous and current sampling times.

Further, distance detectors other than the reflected light quantity type may be used; for example, a triangulation type optical detector, an eddy-current type detector, or an ultrasonic type detector may be used for this purpose.

As described above, according to this invention, a vector normal to the model surface is obtained based on the previously sampled values and currently sampled values obtained from the two non-contact distance detectors mounted to the tracer head, and the tracer head is controlled to be in alignment with the direction of the projected vector obtained by projecting the normal vector onto the predetermined plane. Accordingly, the measurement axes of the non-contact distance detectors are always oriented in a direction as perpendicular as possible to the model surface, whereby the distance measurement can be carried out with high accuracy and the tracing accuracy is improved. Moreover, a dead angle attributable to the interference of the model surface does not exist, and thus a complex three-dimensional model can be traced.

I claim:

1. A non-contact tracer control device for carrying out a profile machining on a workpiece while tracing a profile of a model in a non-contact fashion, comprising:

first and second non-contact distance detectors mounted to a tracer head, which is controlled through a predetermined straight axis and a rotary axis rotatable about the straight axis, and inclined at a predetermined angle with respect to the straight axis, each detector individually measuring a distance of a surface of the model therefrom;

sampling means for sampling measurement values obtained by the respective first and second non-contact distance detectors at predetermined sampling intervals;

storage means for storing a first measurement value obtained by the first non-contact distance detector and a second measurement value obtained by the second non-contact distance detector, both sampled at a previous sampling time;

vector calculating means for calculating a vector normal to the surface of the model, based on at least three of four measurement values including the first and second measurement values, a third measurement value obtained by the first non-contact distance detector sampled at a current sampling time, and a fourth measurement value obtained by the second non-contact distance detector sampled at the current sampling time;

angle calculating means for calculating an angle of a projected vector obtained by projecting the normal vector onto a plane perpendicular to the straight axis; and rotary axis driving means for rotating the rotary axis in a direction of said angle.

2. A non-contact tracer control device according to claim 1, wherein said vector calculating means obtains coordinate values of three different points on the surface of the model, based on said three measured points, obtains first and second vectors directed from one of the three different points to the other two points, respectively, and calculates said normal vector by calculating an outer product of the first and second vectors.

3. A non-contact tracer control device according to claim 1, wherein said straight axis is controlled such that a measurement point on the surface of the model associated with one of the first and second distance detectors is positioned on the straight axis, regardless of a rotation of the rotary axis.

4. A non-contact tracer control device according to claim 1, wherein said first and second non-contact distance detectors each comprise an optical distance detector.

* * * * *